(12) United States Patent
Abdallah et al.

(10) Patent No.: US 12,412,187 B2
(45) Date of Patent: *Sep. 9, 2025

(54) GUIDED REAL ESTATE SEARCH USING CONTEXTUAL REFINEMENT

(71) Applicant: MFTB Holdco, Inc., Seattle, WA (US)

(72) Inventors: Farah Abdallah, Seattle, WA (US); Andrei Lopatenko, Seattle, WA (US); Tarun Agarwal, Redmond, WA (US); Arun Balagopalan, Astoria, NY (US); Jackson R. Gibbons, Seattle, WA (US)

(73) Assignee: MFTB HOLDCO, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,832

(22) Filed: Apr. 9, 2024

(65) Prior Publication Data

US 2024/0257169 A1 Aug. 1, 2024

Related U.S. Application Data

(63) Continuation of application No. 18/326,150, filed on May 31, 2023, now Pat. No. 11,978,073, which is a (Continued)

(51) Int. Cl.
*G06Q 30/0204* (2023.01)
*G06F 3/04842* (2022.01)
(Continued)

(52) U.S. Cl.
CPC ..... *G06Q 30/0205* (2013.01); *G06F 3/04842* (2013.01); *G06F 16/29* (2019.01);
(Continued)

(58) Field of Classification Search
CPC ........... G06Q 30/0205; G06Q 30/0625; G06Q 50/16; G06Q 30/0207–0277;
(Continued)

(56) References Cited

U.S. PATENT DOCUMENTS 11,687,959 B2  6/2023  Abdallah et al.
11,978,073 B2  5/2024  Abdallah et al.
(Continued)

FOREIGN PATENT DOCUMENTS

CN   108228663 A   6/2018
CN   110968801 A   4/2020
(Continued)

OTHER PUBLICATIONS

International Search Report and Written Opinion received for counterpart International Application No. PCT/US2021/050794 mailed Jan. 5, 2022 (11 pages).

*Primary Examiner* — Chinyere Mpamugo
(74) *Attorney, Agent, or Firm* — Merchant & Gould P.C.

(57) ABSTRACT

A guided search system for suggesting and arranging filter criteria within a user interface for presentation to a user to help guide the user's search for listings is disclosed. The system builds one or more filter criteria frequency data structures indicative of the number of times each filter criterion has been used to filter search results and how often different filter criteria are used together. The system uses the frequency data structures to predict which filter criteria a user will likely employ to narrow their search given the filter criteria the user has already used. The system provides techniques for arranging or rearranging filter criteria within a user interface, by moving, placing, or ordering suggested filter criteria within the user interface, where a user is likely to be able to recognize and interact with the placed filter criteria, based on the determined amounts of use.

18 Claims, 10 Drawing Sheets

Related U.S. Application Data continuation of application No. 17/025,330, filed on Sep. 18, 2020, now Pat. No. 11,687,959.

(51) Int. Cl.
| | | |
|---|---|---|
| *G06F 16/29* | (2019.01) | |
| *G06F 16/9532* | (2019.01) | |
| *G06F 16/9535* | (2019.01) | |
| *G06F 16/9537* | (2019.01) | |
| *G06F 16/9538* | (2019.01) | |
| *G06Q 30/0601* | (2023.01) | |
| *G06Q 50/16* | (2024.01) | |

(52) U.S. Cl.
CPC ...... *G06F 16/9532* (2019.01); *G06F 16/9535* (2019.01); *G06F 16/9537* (2019.01); *G06F 16/9538* (2019.01); *G06Q 30/0625* (2013.01); *G06Q 50/16* (2013.01)

(58) Field of Classification Search
CPC .. G06F 3/04842; G06F 16/29; G06F 16/9532; G06F 16/9535; G06F 16/9537; G06F 16/9538; G06F 3/0482; G06F 3/04847
See application file for complete search history.

(56) References Cited

U.S. PATENT DOCUMENTS

| | | |
|---|---|---|
| 2010/0094548 A1 | 4/2010 | Tadman et al. |
| 2013/0103595 A1 | 4/2013 | Berry et al. |
| 2017/0365019 A1 | 12/2017 | He |
| 2018/0329959 A1* | 11/2018 | Cao .............. G06F 16/9535 |
| 2020/0103977 A1* | 4/2020 | Selim .............. H04N 21/431 |

FOREIGN PATENT DOCUMENTS

| | | |
|---|---|---|
| JP | 2017-167893 A | 9/2017 |
| KR | 10-2020-0031577 A | 3/2020 |

* cited by examiner

FIG. 8

GUIDED REAL ESTATE SEARCH USING CONTEXTUAL REFINEMENT

CROSS-REFERENCE TO PRIORITY APPLICATIONS

This application is a continuation of U.S. patent application Ser. No. 18/326,150, filed on May 31, 2023, entitled "GUIDED REAL ESTATE SEARCH USING CONTEXTUAL REFINEMENT," which is a continuation of U.S. patent application Ser. No. 17/025,330, filed on Sep. 18, 2020 (now U.S. Pat. No. 11,687,959), entitled "GUIDED REAL ESTATE SEARCH USING CONTEXTUAL REFINEMENT," which are both incorporated by reference herein in their entireties.

RELATED APPLICATIONS

This application is related to U.S. patent application Ser. No. 11/347,000 (now U.S. Pat. No. 8,676,680), filed on Feb. 3, 2006, U.S. patent application Ser. No. 11/347,024 (now U.S. Pat. No. 7,970,674), filed on Feb. 3, 2006, U.S. patent application Ser. No. 11/524,047 (now U.S. patent Publication No. 2008/0077458), filed on Sep. 19, 2006, U.S. patent application Ser. No. 11/524,048 (now U.S. Pat. No. 8,515,839), filed on Sep. 19, 2006, U.S. patent application Ser. No. 11/971,758 (now U.S. Pat. No. 8,140,421), filed on Jan. 9, 2008, U.S. patent application Ser. No. 13/797,363 (now U.S. Pat. No. 9,361,583), filed on Mar. 12, 2013, U.S. patent application Ser. No. 13/828,680, filed on Mar. 14, 2013, U.S. patent application Ser. No. 14/078,076 (now U.S. Pat. No. 10,754,884), filed on Nov. 12, 2013, and U.S. patent application Ser. No. 14/325,094, filed on Jul. 7, 2014, each of which is herein incorporated by reference in its entirety.

TECHNICAL FIELD

The described technology is directed to the field of automated information tools, including automated real estate information tools.

BACKGROUND

In today's housing market, property seekers (e.g., potential buyers or potential renters) often use online tools to find properties of interest. For example, a property seeker might use such a tool to search for properties within a certain geographic area or region. Furthermore, the property seeker may further narrow their search by specifying certain criteria for each of one or more filters, such as specifying a value or range (closed- or open-ended) of values in order to define the user's requirements or preferences. For example, a user searching for homes in Seattle may further narrow their search by specifying a maximum price, a minimum and maximum number of bedrooms, and an indication of whether the results should (or should not) include an air conditioner (e.g., true or false), etc. In addition, a property seeker may narrow their search by specifying textual search terms to be matched against the home description or attributes of the home.

BRIEF DESCRIPTION OF THE DRAWINGS

FIG. 8 is a display page illustrating a user interface for specifying filter criteria and displaying listings and suggested filter criteria in accordance with some embodiments.

DETAILED DESCRIPTION

Figure 1:
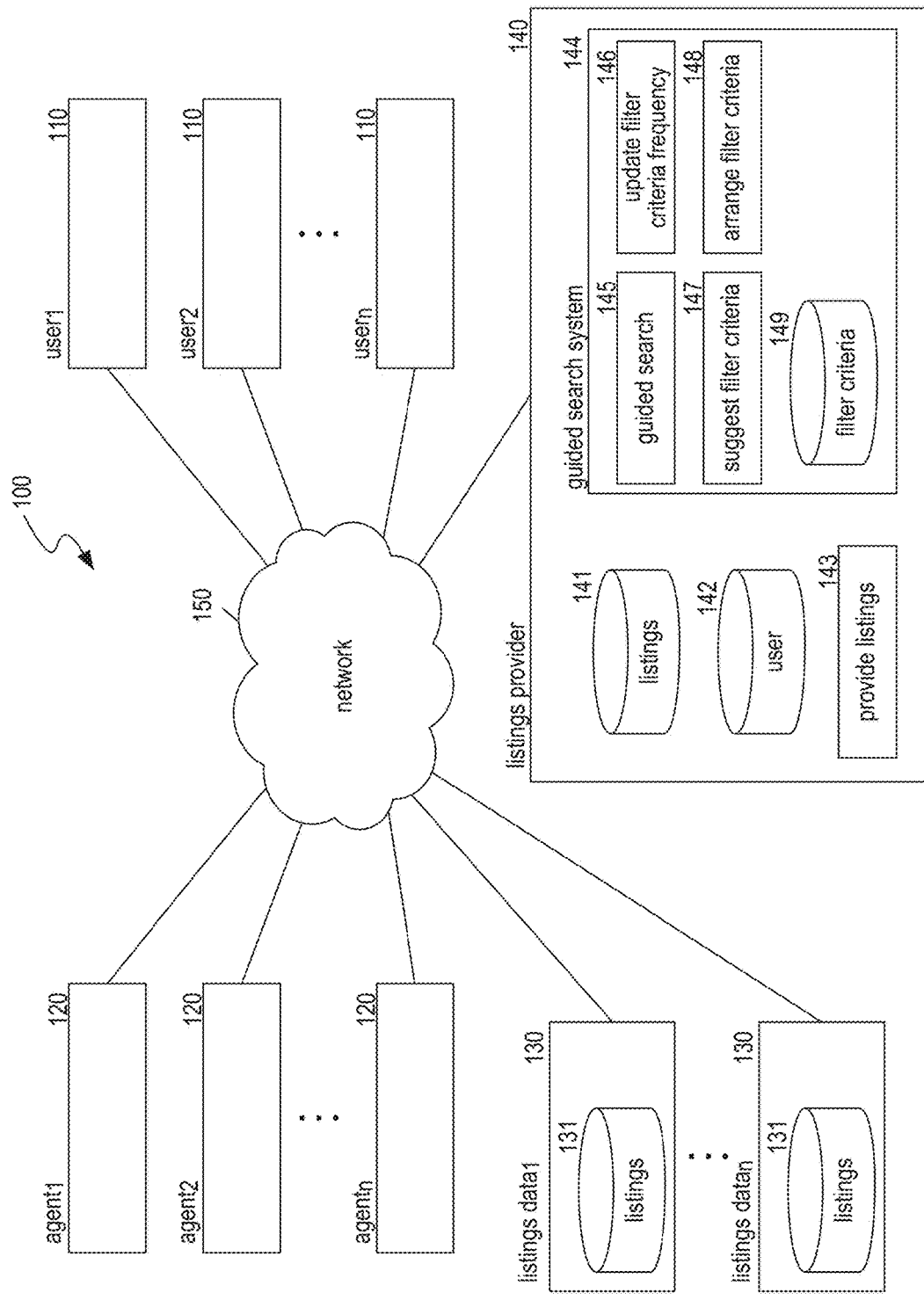
FIG. 1 is a block diagram illustrating an environment in which the guided search system operates in accordance with some embodiments.

The inventors have recognized that conventional approaches to presenting listings to property seekers have significant disadvantages. For example, conventional approaches typically require a property seeker to sort through and configure the plentiful filters and corresponding criteria available to the property seeker to fine tune their search, thus making it time-consuming and/or cumbersome to elicit the correct set or combination of filter criteria for their searches. For example, while some filters may be readily visible and readily available for configuration by a property seeker, other filters may be difficult to find and/or configure due to, for example, user interface limitations, thereby making it difficult for the property seeker to customize their search and find the property or properties consistent with their preferences. As a result, the property seeker may miss out on their ideal property or properties and/or give up on the process altogether due to frustration or lack of time.

Furthermore, property seekers are often limited in the ways in which they can interact with filters and filter criteria, such as maneuvering through and configuring user interface elements corresponding to different filters and filter criteria, thus making it difficult for property seekers to find appropriate properties. Additionally, property seekers may have a large number of filter criteria from which to choose, making it difficult to find the filter criteria that are likely to be most useful or to be notified of such filter criteria. Typically, property seekers are presented with a user interface that allows a user to manually configure filters by selecting or entering filter criteria, such as a number of bedrooms, number of bathrooms, minimum and maximum prices, home type, etc. Furthermore, listing services do not attempt to notify property seekers of suggested searches or filter criterion, either during a property seeker's search session or while the property seeker is away.

The inventors have recognized that there can be relationships between filter criteria. For example, a property seeker looking for property in Seattle may be more likely to specify, as part of their search, that the property have a mountain view than property seekers looking for property in Omaha.

As another example, a property seeker looking for a property that is near schools may be more likely to specify that the property have four bedrooms than one bedroom. Traditional techniques do not offer a method to guide a search by predicting which filter criteria may be more useful to a property seeker and presenting those filter criteria to the user for easy selection and use. Therefore, what is needed is a system that allows property seekers to easily identify and employ filter criteria that are likely to be useful to the property seeker's quest for properties.

Accordingly, the inventors have conceived a software and/or hardware guided search system for suggesting and arranging filter criteria within an improved user interface (e.g., graphical user interface, textual user interface, audio or voice user interface, etc.) for presentation to a user to help guide the user's search for listings, such as real estate listings, listings for products and/or services, etc. In some embodiments, the guided search system initially receives, from a user, a selection of a geographic area, such as a selection of a ZIP code, postal code, municipality, county, state, or any combination thereof, and so on. As another example, the guided search system can identify a geographic area based on information received from a user, such as a geographic area bounded or defined by a user's selection of a number of coordinates, a center point and a radius, a selection of an area manually drawn by a user, a portion of a map zoomed in on (or out of) by a user, and so on. In response to receiving the selection of the geographic area, the guided search system identifies real estate listings associated with the geographic area, such as real estate listings that are for sale or for rent within the geographic area and provides one or more of the identified listings for presentation to the user. In addition to identifying and providing real estate listings, the guided search system can also provide a user interface through which the user can configure filters to further narrow their search by providing corresponding filter criteria. For example, the user interface can allow the user to specify a minimum and/or maximum number of bedrooms, a minimum and/or maximum number of bathrooms, a minimum and/or maximum square footage, whether the property has a garage, a pool, air conditioning, a mountain or ocean view, and so on. After the user provides or updates their filter criteria by, for example, changing the criteria of a filter or submitting a new search, the guided search system records the user's use of the filter criteria in conjunction with the geographic area. In this manner, the guided search system can build and record relationships not only between filter criteria and geographic areas but between different filter criteria. For example, if a user were to filter search results (e.g., submit an initial search query or filter search results from any previous query) for rental properties in Tucson, AZ by specifying that the properties should have a minimum of 2 bedrooms, 2 or more bathrooms, a sports court, a price between $450,000 and $700,000, the guided search system can record that each of these filter criteria (i.e., location=Tucson, AZ, minBedrooms=2, bathrooms=2+, hasSportsCourt=true, minPrice=$450,000, maxPrice=$700,000) were all used together to filter search results (as part of one or more searches). Accordingly, the guided search system can build one or more filter criteria frequency data structures (e.g., tree, predictive model, table, list, etc.) that represents or estimates the number of times each filter criterion and/or combination of filter criteria has been used to filter search results and how often different filter criteria are used together (e.g., in combination). In this manner, the guided search system maintains a record of how often different combinations and/or permutations (ordered combinations) of filter criteria are used or employed to filter listings, thereby providing some predictive insight into which filter criteria a user will likely employ given the filter criteria they have already used to filter search results. For example, the guided search system can use one or more machine learning techniques, such as neural networks, learning to rank, deep learning, etc. to train a model to predict a user's interaction based on, for example, past user interactions with filter criteria, other information about the user and the user's preferences (e.g., demographic information, location, past user interactions with search, interactions with other part of the information), other interactions of the users with the system, information about a geographic area and properties located there, etc. Moreover, the guided search system can train models to estimate the likelihood of desirable downstream user actions, such as training a regression model to estimate how many times the user will save a home, share a home, submit contact information to an agent, etc. given that they are presented with a particular filter by the system. These estimates can be used to rank the filters for presentation to a user. Moreover, input to the predictive models need not be limited to past user interactions. In some embodiments, the guided search system uses features of a geographic area itself in combination with the user data, such as a distribution of values for a filter (e.g. bedroom count) over properties in the region that meet the user's criteria. In this manner, predictive models can be generalized to both a) regions for which the system has limited user data and b) types of filters that are not well supported in the user interface. In some embodiments, filter criteria frequency data structures can represent frequency data in addition to (or instead of) the number of times each set of filter criteria has been used to filter search results, such as the number of times that users have taken a particular action after performing a search with corresponding filter criteria, such as saving a listing into a set of "saved listings" associated with the user, sharing a listing, submitting contact information, clicking on a listing, registering to receive additional information about one or more listings, sending a message (e.g., email, text, online submission form) regarding one or more listings, saving search results, and so on.

Because the guided search system maintains information about the filter criteria that users have used, the guided search system can also use one or more filter criteria frequency data structures to determine which filter criteria those users are likely to employ or find useful in the future and make suggestions to help guide the user's search. For example, if a new user has performed a new search that only specifies a geographic area, such as a ZIP code, the guided search system can first determine which filter criteria other users have previously used to filter results from that geographic area and how often each of those filter criteria were used. Thus, the guided search system can determine not only which filter criteria are used, but also an amount of use (e.g., a number of times employed) for each of those filter criteria. Accordingly, the guided search system can determine which filter criteria are used most often and suggest to the user the most commonly (e.g., a predetermined number or percentage of filter criteria, such as the top 3, top 8, top 2%, etc.) employed filter criteria associated with the user's selected geographic area (or current search). For example, in response to receiving a search for homes in Los Angeles, CA, the guided search system can determine that a large percentage of users searching for homes in Los Angeles, CA have also specified a requirement for an air conditioner while very few of them have specified that the home have a high walkability score. Accordingly, the guided search system can use this information to suggest that the user filter their results by specifying a requirement for an air conditioner. The guided search system can select additional filter criteria to suggest to the user by determining how often filter criteria are used, determining an appropriate number of filter criteria to suggest, and providing suggested filter criteria for display or presentation to the user via a user interface. The guided search system can determine the appropriate number using a predetermined value (e.g., top 5, top 10, top 50), a predetermined percentage (e.g., top 1%, top 8%, top 33%), by determining an amount of space or area within a graphical or textual user interface available for presenting suggested filter criteria, determining an amount of time for presenting suggested filter criteria as part of an audio or voice user interface, and so on. In some embodiments, the guided search system provides the suggestions by presenting user interface element(s) (e.g., buttons, radio buttons, dropdown menus, text, voice or speech commands and prompts, etc.) that the user can select or otherwise interact with in order to further narrow the results. Furthermore, the guided search system can provide an alert service that allows a user to subscribe to receive alerts for suggested searches or filter criteria for narrowing a previous search.

In some embodiments, the guided search system suggests filter criteria to a user based on the filter criteria that the user has already selected. For example, a user searching for homes in ZIP Code 91360 may further wish to narrow their search results by specifying filter criteria to limit the results to homes with three or more bedrooms, a maximum price of $750,000, and a garage with two or more parking spots. In response to receiving these filter criteria from the user, the guided search system uses or searches through one or more filter criteria frequency data structures to identify other filter criteria that have been used with this combination of filter criteria and an amount of use for each of the identified filter criteria (e.g., how many times each of the identified filter criteria have been used with the combination of filter criteria submitted by the user). For example, the guided search system can determine that users searching for homes in ZIP Code 91360 that have specified filter criteria including three or more bedrooms, a maximum price of $750,000, and a garage with two or more parking spots have also frequently (e.g., more than a predetermined percentage of times, such as 25%, 50%, 80%) specified requirements for 1) nearby schools and 2) that small dogs be allowed but have infrequently (e.g., fewer than a predetermined percentage of times, such as 20%, 40%, 90%) specified a requirement for a city view and/or modern architecture. Once these filter criteria have been identified, the guided search system can suggest that the user further narrow their search results according to those filter criteria that have been used in conjunction with the filter criteria specified by the user. For example, the guided search system can provide for presentation one or more user interface elements that, when selected, will further filter the search results to include only listings with nearby schools and/or that allow small dogs and exclude any such elements for city views and modern architecture. The user can further narrow their search quickly and easily by selecting or otherwise interacting with the user interface elements, thereby streamlining the user's journey to finding an appropriate listing or set of listings. Furthermore, as the user continues to interact with the filters (e.g., by adding, removing, or changing filter criteria), the guided search system can dynamically update the search results and the suggested filter criteria and update the user interface accordingly. Moreover, each of the user's interactions with the filters can be used to update filter criteria frequency data structures that the guided search system uses to identify filter criteria to suggest. Accordingly, the guided search system can use the user's own selection and customization of filters and their associated filter criteria to suggest to the user filter criteria that the user is likely to find useful and employ as the user performs the otherwise potentially time-consuming task of searching for listings. Accordingly, the guided search system can streamline the user's journey (e.g., reduce the number of clicks or other interactions) through the listing searching process, thereby conserving the use of valuable and important resources, such as a) the user's time and b) computing resources of not only the user but the listings provider as well, such as CPU resources, memory resources, network resources, data resources, display space within a user interface, time-constraints related to an audio- or voice-based user interface, and so on.

Thus, in order to allow property seekers to easily identify and employ filter criteria that are likely to be useful to the property seeker's search for properties, the guided search system provides techniques for arranging or rearranging filter criteria as part of a user interface, by moving, placing, or ordering the suggested or most used filter criteria within the user interface, where a user is likely to be able to recognize and interact with the placed filter criteria, based on determined amounts of use. The amount of use of each filter criterion is automatically determined by a processor that tracks a number of times each combination of filter criteria is used to filter search results over a period of time (e.g., day, week, month, year, etc.). In some embodiments, a user can choose to manually specify which filter criteria they expect to use (or expects not to use) most often using any of a number of ordering and/or ranking systems known to those having ordinary skill in the art. In this manner, the guided search system allows a user to boost or downgrade filter criteria in order to enhance their own user experience. As another example, if the guided search system determines that a particular user has ignored one or more suggested filter criteria more than a predetermined number of times (e.g., two, five ten, fifteen), then the guided search system can flag those filter criteria so that they are not suggested to that particular user in the future. Similarly, because user engagement with the suggested filter criteria can be fed back into guided search system, if lots of users do not interact with a specific filter suggestion in a specific region, the model will learn not to suggest that filter anymore in that region. In this manner, user interactions with the guided search system and the filter criteria frequency data structures, including models, enhance and improve the filter criteria frequency data structures over time. In addition, the suggestions can be personalized to the user based on a vector input to the model which encodes such information such as buyer propensity, renter propensity, or other user-based features generated separately. Moreover, for users that have a long history of interaction with the guided search system, the suggestions can be tailored to the specific user to suggest filter criteria that they have selected in the past.

FIG. 1 is a block diagram illustrating an environment in which the guided search system operates in accordance with some embodiments of the disclosed technology. In this example, environment 100 is comprised of user computing systems 110, agent computing systems 120, listings data computing systems 140, listing provider computing system 140, and network 150. Listings provider computing system 140 hosts listings store 141, user data store 142, provide listings component 143, and guided search system 144, which comprises a guided search component 145, an update filter criteria frequency component 146, a suggest filter criteria component 147, an arrange filter criteria component 148, and a filter criteria store 149. Guided search component 145 invokes update filter criteria frequency component 146 to update one or more filter criteria frequency data structures. In some examples, update filter criteria frequency component 146 can be invoked each time guided search component 145 receives filter criteria from a user, such as when a user adds, removes, changes, or submits new filter criteria. In some examples, the guided search system can cache or store these changes or updates to filter criteria and invoke update filter frequency component periodically, such as once an hour, once a day, once a week, and so on. Guided search component 145 invokes suggest filter criteria component 147 to identify filter criteria to suggest to a user based on a user's search and associated filter criteria. Guided search component 145 invokes arrange filter criteria component 148 to arrange suggested filter criteria for presentation to the user. Listings provider computing system 140 invokes provide listings component 143 to identify and provide listings, consistent with a user's filter criteria, to the user. Filter criteria store 149 stores information about filter criteria employed by users, such as filter criteria frequency data structures. In some examples, filter criteria store 149 can store global filter criteria frequency information, such as a global filter criteria data structure that represents filter criteria and filter criteria combinations used by multiple users of the guided search system. In some examples, filter criteria store 149 can store separate filter criteria frequency information for each user, such as a unique filter criteria data structure that represents filter criteria and filter criteria combinations used by an individual user of the guided search system. In some examples, filter criteria store 149 can store separate filter criteria frequency information for a group of users, such as a unique filter criteria data structure that represents filter criteria and filter criteria combinations used by users that have shown an interest in a particular listing or set of listings by, for example, selecting to view additional information about a listing, requesting to be notified by a real estate agent regarding one or more of a set of listings, and so on. In some examples, filter criteria store 149 can store global and separate filter criteria frequency information. Listings data store 141 stores information about listings and their associated attributes, such as, in the case of real estate listings, a size, price, number of bedrooms, number bathrooms, city, state, postal code, number of ceiling fans, a unique identifier corresponding to the listing, and so on. User data store 142 stores information about individual users, such as a unique identifier corresponding to the user, filter criteria that the user has used to filter search results, and metadata about those filter criteria (e.g., time, session, whether or not the filter criteria was used by the user in response to it being suggested to the user), demographics data, online behavior data, groups that each user is associated with, and so on. Users, such as property seekers, property owners, property managers, and so on, can interact with the guided search system 135 via user computing systems 110 over network 150 using a user interface provided by, for example, an operating system, web browser, listings viewer application, or other application. Agents, such as a listing agent, can interact with the guided search system 135 via agent computing systems 120 over network 150 using a user interface provided by, for example, an operating system, web browser, listings viewer application, or other application. Listings data computing systems 130 provide access to listings stores 131 storing listings of goods or services for sale or rent, such as aggregated real estate listings provided by a multiple listing service, such as Bright MLS, California-Regional Multiple Listing Service, and so on or services that provide access to MLS listings, such as Zillow, etc. In some examples, the listings provider stores listings retrieved from listing services via listing data computing systems 130, agent computing systems 120, and/or user computing systems 110. In this example, listing data computing systems 130, agent computing systems 120, user computing systems 110, and listing provider computing system 140 can communicate via network 150.

The computing devices and systems on which the guided search system can be implemented can include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices can include keyboards, pointing devices, touchscreens, gesture recognition devices (e.g., for air gestures), thermostats, smart devices, head and eye tracking devices, microphones for voice or speech recognition, and so on. The computing devices can include desktop computers, laptops, tablets, e-readers, personal digital assistants, smartphones, gaming devices, servers, and computer systems such as massively parallel systems. The computing devices can each act as a server or client to other server or client devices. The computing devices can access computer-readable media that includes computer-readable storage media and data transmission media. The computer-readable storage media are tangible storage means that do not include transitory, propagating signals. Examples of computer-readable storage media include memory such as primary memory, cache memory, and secondary memory (e.g., CD, DVD, Blu-Ray) and include other storage means. Moreover, data may be stored in any of a number of data structures and data stores, such as a databases, files, lists, emails, distributed data stores, storage clouds, etc. The computer-readable storage media can have recorded upon or can be encoded with computer-executable instructions or logic that implements the guided search system, such as a component comprising computer-executable instructions stored in one or more memories for execution by one or more processors. In addition, the stored information can be encrypted. The data transmission media are used for transmitting data via transitory, propagating signals or carrier waves (e.g., electromagnetism) via a wired or wireless connection. In addition, the transmitted information can be encrypted. In some cases, the guided search system can transmit various alerts to a user based on a transmission schedule, such as an alert to inform the user that a goal for a given period has or has not been met or that one or more changes to a constraint can enable the system to further optimize a goal. Furthermore, the guided search system can transmit an alert over a wireless communication channel to a wireless device associated with a remote user or a computer of the remote user based upon a destination address associated with the user and a transmission schedule in order to, for example, periodically recommend search filter criteria. In some cases, such an alert can activate a listings viewer application to cause the alert to display, on a remote user computer and to enable a connection via, a universal resource locator (URL), to a data source over the internet, for example, when the wireless device is locally connected to the remote user computer and the remote user computer comes online. Various communications links can be used, such as the Internet, a local area network, a wide area network, a point-to-point dial-up connection, a cell phone network, and so on for connecting the computing systems and devices to other computing systems and devices to send and/or receive data, such as via the Internet or another network and its networking hardware, such as switches, routers, repeaters, electrical cables and optical fibers, light emitters and receivers, radio transmitters and receivers, and the like. While computing systems and devices configured as described above are typically used to support the operation of the guided search system, those skilled in the art will appreciate that the guided search system can be implemented using devices of various types and configurations, and having various components.

The guided search system can be described in the general context of computer-executable instructions, such as program modules and components, executed by one or more computers, processors, or other devices, including single-board computers and on-demand cloud computing platforms. Generally, program modules or components include routines, programs, objects, data structures, and so on that perform particular tasks or implement particular data types. Typically, the functionality of the program modules can be combined or distributed as desired in various embodiments. Aspects of the guided search system can be implemented in hardware using, for example, an application-specific integrated circuit ("ASIC").

Figure 2:
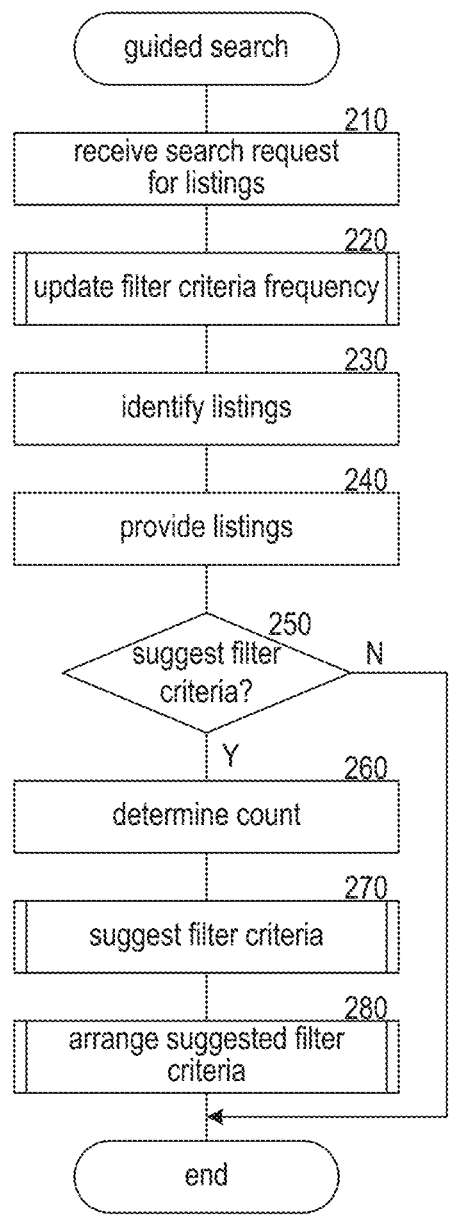
FIG. 2 is a flow diagram illustrating the processing of a guided search component in accordance with some embodiments.

FIG. 2 is a flow diagram illustrating the processing of a guided search component in accordance with some embodiments of the disclosed technology. The guided search system invokes the guided search component to identify listings and suggested filter criteria for presentation to a user based on a user's search request and associated filter criteria. In block 210, the component receives a search request for listings and its associated filter state, such as a request from a user that specifies any number of filter criteria (e.g., a geographic area and a maximum price), a change in filter state, and so on. In block 220 the component invokes an update filter criteria frequency component to update a filter criteria frequency data structure (or structures) based on the received request. In some embodiments, rather than updating the filter criteria frequency component with each request, the guided search system only updates the filter criteria frequency component of users that have shown an increased or higher than average propensity for buying, such as users that have clicked on more than a predetermined number of listings, users that have registered to receive additional information about one or more listings, users that have sent a message (e.g., email, text, online submission form) regarding one or more listings, users that have saved search results, etc. In this manner, the guided search system can optimize the filter criteria frequency data structures for particular types of user (e.g., users that have shown an increased or higher than average propensity for buying). In some embodiments, the component may invoke the update filter criteria frequency component multiple times, once for each of a plurality of filter criteria frequency data structures, such as a global frequency data structure, a user's individual frequency data structure, and/or a frequency data structure associated with a particular geographic area, group of users, etc. Alternatively, the update filter criteria frequency component may be configured to loop through each of a plurality of filter criteria data structures. In block 230, the component identifies listings that are consistent with the received request, such as all listings within the geographic area specified in the received request and that have a price that does not exceed the maximum price specified by the received request. In block 240, the component provides the identified listings to the user by, for example, sending an indication of the identified listings along with associated information and attributes (e.g., address, price, image, number of bedrooms, number of bathrooms, size, status, etc.). In decision block 250, if the component is configured to suggest filter criteria, then the component continues at block 260, else processing of the component completes. In block 260, the component determines a number of filter criteria to suggest based on, for example, a predetermined number or percentage of filter criteria. In block 270, the component invokes a suggest filter criteria component to identify filter criteria to suggest to the user based on the received request and/or the user's past behavior, such as filter criteria used by the user during a current or previous session or sessions (e.g., such the user's sessions during a previous time period (e.g., day, week, month, year) or a predetermined number (e.g., five, ten, 50, 100) of the user's most recent sessions). In block 280, the component invokes an arrange filter criteria to arrange, within a user interface, the suggested filter criteria returned by the suggest filter criteria component and then completes. Furthermore, the component can also track metrics about a user's interactions after being presented with suggested filter criteria, such as whether a user saves a home, submits a contact event, shares a home, dwells on a home display page, etc. This interaction data can then be joined back with the filter selections of the user and used to rank filter suggestions for later users by, for example, increasing the rank of filter criteria selections that result in a particular set of one or more interactions. In some embodiments, a means for guiding a user's search for listings comprises one or more computers or processors configured to carry out an algorithm disclosed in FIG. 2 and this paragraph.

Figure 3:
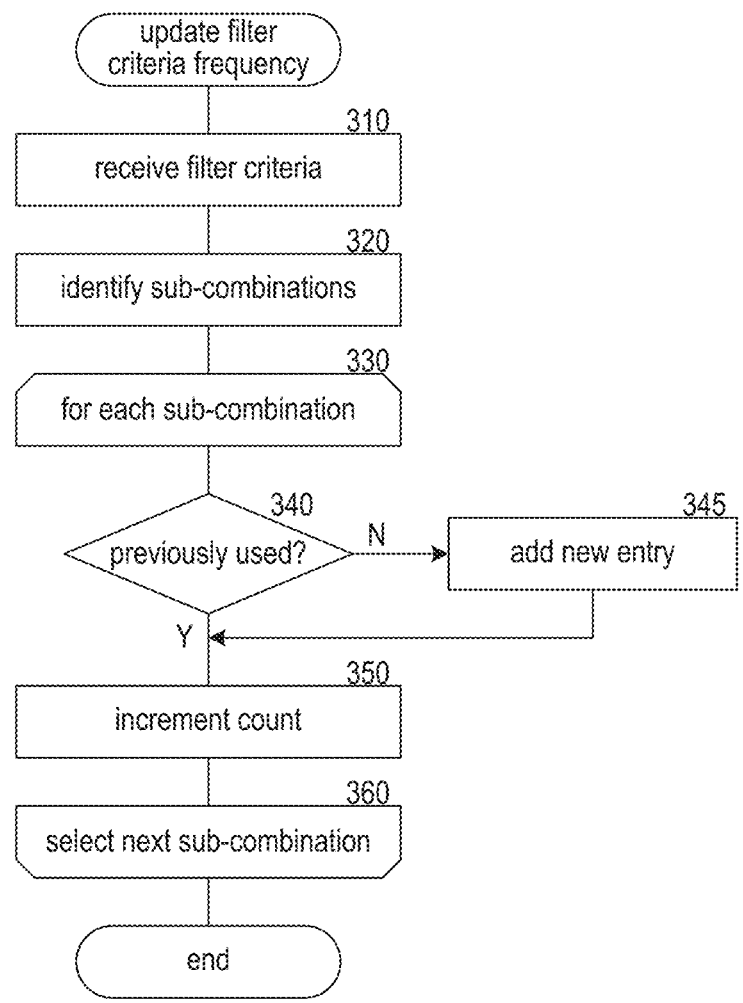
FIG. 3 is a flow diagram illustrating the processing of an update filter criteria frequency component in accordance with some embodiments.

FIG. 3 is a flow diagram illustrating the processing of an update filter criteria frequency component in accordance with some embodiments of the disclosed technology. The guided search component invokes the update filter criteria frequency component in response to, for example, receiving a request from a user, such as an initial or updated request for listings that satisfy the user's filter criteria. In some examples, the component can be invoked to update a single filter criteria frequency data structure, such a global filter criteria frequency data structure. In some examples, the guided search system can be invoked to update multiple filter criteria frequency data structures, such as a global frequency data structure, a user's individual frequency data structure, and/or a frequency data structure associated with a particular geographic area, group of users, etc. In block 310, the component receives filter criteria, such as a list of all filter criteria a user submitted as part of a search. For example, a user may submit a search for homes with the following four filter criteria: within the Ballard neighborhood of Seattle (i.e., neighborhood=Ballard), with three or more bedrooms (i.e., bedrooms=3+), two or more bathrooms (i.e., bathrooms=2+), and a water view (i.e., waterview=true). In block 320, the component identifies all sub-combinations of filter criteria within the received filter criteria (i.e., any subset of the received filter criteria, including proper subsets and improper subsets of the receiver filter criteria) according to a specified level of granularity. For example, the component may identify all sub-combinations of two or more, three or more, and so on from the received filter criteria. In this example, the sub-combinations of filter criteria include the following two-filter criteria sub-combinations (sub-combinations with two filter criteria): {neighborhood=Ballard and bedrooms=3+}, {neighborhood=Ballard and bathrooms=2+}, {neighborhood=Ballard and waterview=true}, {bedrooms=3+ and bathrooms=2+}, {bedrooms=3+ and waterview=true}, and {bathrooms=2+ and waterview=true}; the following three-filter criteria sub-combinations (sub-combinations with three filter criteria): {neighborhood=Ballard and bedrooms=3+ and bathrooms=2+}, {neighborhood=Ballard and bedrooms=3+ and waterview=true}, {neighborhood=Ballard and bathrooms=2+ and waterview=true}, and {bedrooms=3+ and bathrooms=2+ and waterview=true}, and the following four-filter criteria sub-combination (sub-combination with four filter criteria): {neighborhood=Ballard and bedrooms=3+ and bathrooms=2+ and waterview=true}. The granularity allows the component to filter out sub-combinations of less than a desired number of filter criteria. Thus, if the granularity is set to 3, then the component will only identify the three filter criteria sub-combinations and the four filter criteria sub-combination and ignore all filter criteria sub-combinations with less than three filter criteria. In other words, if the granularity is set to n, then the component will only identify filter criteria sub-combinations with n or more filter criteria and ignore filter criteria sub-combinations with fewer than n filter criteria. In some examples, employed filter criteria are associated with a timestamp so that the user's employment of different filter criteria can be tracked through time. In this manner, the component can not only identify combinations of filter criteria but also, or instead, permutations (ordered combinations) of filter criteria in accordance with the above. Furthermore, the guided search system can use the timestamp information to purge old records, such as periodically removing filter criteria records that are older than a predetermined period of time, such as an hour, day, week, month, and so on. In blocks 330-360, the component loops through each of the identified filter criteria sub-combinations (and each of the filter criteria frequency data structures being processed, if multiple) to record an indication of their use. In decision block 340, if the currently selected filter criteria sub-combination is stored in the currently-selected filter criteria frequency data structure, then the component continues at block 350, else the component continues at block 345. In block 345, the component adds a new entry to the currently-selected filter criteria frequency data structure and initializes its count value to zero. In block 350, the component increments the count value for the currently-selected filter criteria sub-combination in the currently-selected frequency data structure. In block 360, if there are any filter criteria sub-combinations left to be processed, then the component loops back to block 330 to select the next filter criteria sub-combination, else processing of the component completes. In some embodiments, a means for updating filter criteria frequencies comprises one or more computers or processors configured to carry out an algorithm disclosed in FIG. 3 and this paragraph.

Figure 4A:
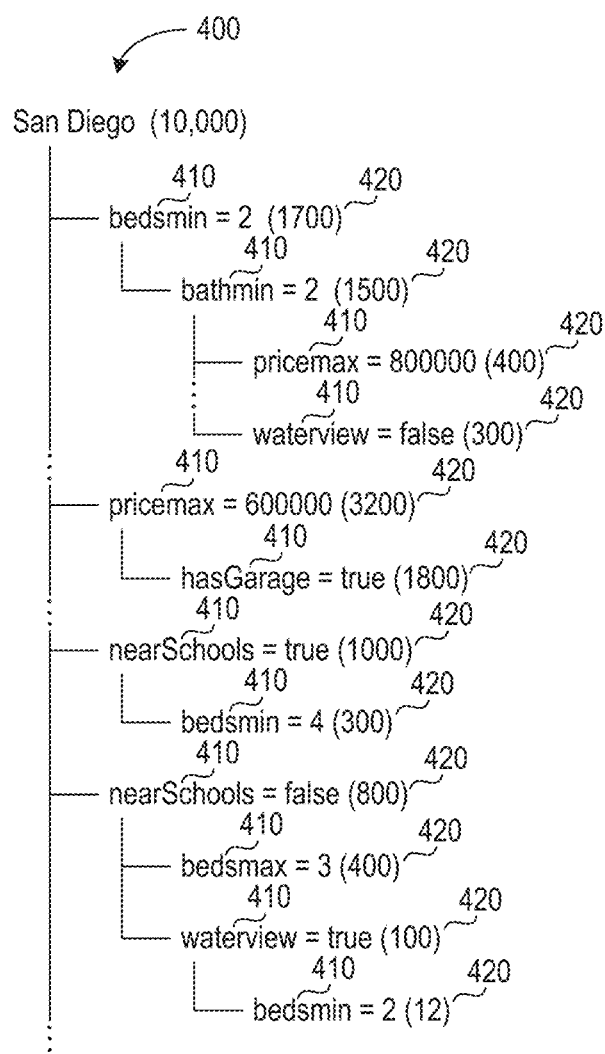
FIGS. 4A and 4B are data structure diagrams illustrating filter criteria frequency data structures in accordance with some embodiments.
Figure 4B:
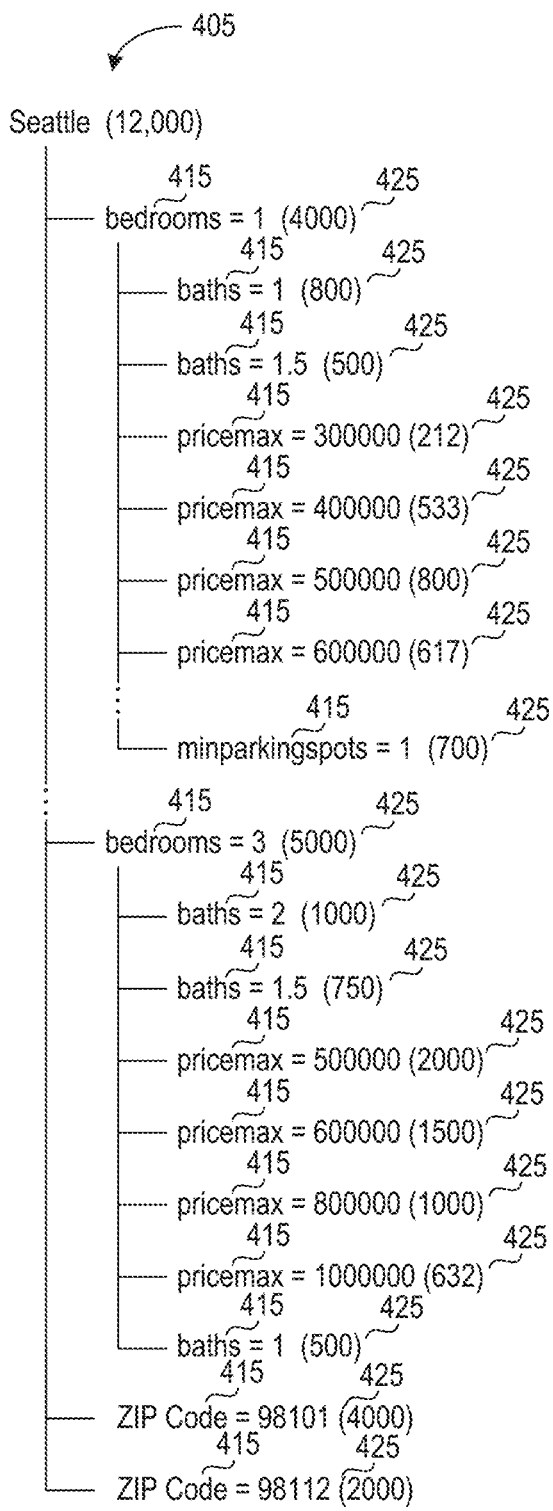

FIGS. 4A and 4B are data structure diagrams illustrating filter criteria frequency data structures in accordance with some embodiments of the disclosed technology. In this example, FIGS. 4A and 4B represent filter criteria frequency data structures for two different geographic areas, San Diego (FIG. 4A) and Seattle (FIG. 4B). In these examples, each filter criteria frequency data structure is represented as a tree (400 and 405), each branch and sub-branch of each tree representing specific filter criteria (410 and 415) and a count (420 and 425) of the number of times that the associated filter criterion was used with filter criteria between the associated filter criterion and the root of the tree. In this example, each count value 420 and 425 corresponds to a filter criterion frequency value for a corresponding combination of filter criteria. For example, tree 400 shows that users have searched for homes in San Diego 10,000 times; that they have searched for homes in San Diego with at least 2 bedrooms 1700 times (i.e., added or included (simultaneously or sequentially) a filter criterion specifying {bedsmin=2 1700 times}); that they have searched for homes in San Diego, with at least 2 bedrooms, and with at least 2 bathrooms 1500 times; that they have searched for homes in San Diego, with at least 2 bedrooms, with at least 2 bathrooms, and with a maximum price of $800,000 900 times; and that they have searched for homes in San Diego, with at least 2 bedrooms, and with at least 2 bathrooms 1500 times; that they have searched for homes in San Diego, with at least 2 bedrooms, with at least 2 bathrooms, and without a water view 300 times. In other words, users have performed searches with the following filter criteria {location=San Diego and bedsmin=2 and bathmin=2 and pricemax=800000} 900 times and have performed searches with the following filter criteria {location=San Diego and bedsmin=2 and bathmin=2 and waterview=false} 300 times. Accordingly, users that perform a search with the following filter criteria {location=San Diego and bedsmin=2 and bathmin=2} are three times (900 versus 300) as likely to further narrow search results by specifying a maximum price of $800,000 (900 instances) than they are to further narrow search results by excluding homes with a waterview (300 instances). Thus, when a user performs a search using specified filter criteria, the guided search system can use the specified filter criteria to search through one or more filter criteria frequency data structures to determine which other filter criteria users have used in conjunction with the filter criteria included with the user's query, determine an amount of use associated with each of these filter criteria (e.g., a number of times employed), and suggest additional filter criteria to the user based on the determined amounts of use. In other words, the guided search system attempts to predict which filter criteria a current user is likely to employ based on the historic use of filter criteria by one or more users of the system so that those filter criteria can be presented to the current user as suggested filter criteria for selection. As another example, tree 405 shows that users have searched for homes in Seattle 12,000 times, that they have further narrowed their search (simultaneously or sequentially) to homes with 3 bedrooms 5000 times (i.e., used a filter criteria specifying {bedrooms=3 5000 times}), that they have further narrowed their search to homes with a maximum price of a) $500,000 2000 times, b) $600,000 1500 times, c) $800,000 1000 times, and d) $1,000,000 632 times. Thus, in this example, users looking for three-bedroom homes in Seattle are more likely to specify a maximum price of $800,000 than they are to specify a maximum price of $1,000,000 (1000 vs. 632), are more likely to specify a maximum price of $600,000 than they are to specify a maximum price of $800,000 (1500 vs. 1000), and are more likely to specify a maximum price of $500,000 than they are to specify a maximum price of $600,000 (2000 vs. 1500). Accordingly, when identifying filter criteria to suggest to a user, the guided search system will be more likely to suggest to a user searching for a three-bedroom home in Seattle, a maximum price of $500,000 than $1,000,000. As another example, FIG. 4B illustrates that a user searching for homes in Seattle is twice as likely to use ZIP Code=98101 as a filter criterion to narrow the results than ZIP Code=98112 (4000 times vs. 2000 times). In short, each filter criteria frequency data structure represents an amount of use associated with each of a plurality of combinations of filter criteria that the guided search system can use to recommend or suggest filter criteria to a user. Although the filter criteria frequency data structures represented in FIGS. 4A and 4B take the form of trees that are easier for the reader to interpret, one of ordinary skill in the art will recognize that filter criteria frequency data structures can take any of a number of forms, such as a flat list, a weighted graph, a table, and so on. Furthermore, the filter criteria frequency data structure may take the form of a trained predictive model, such as a neural network, a model trained using a learning to rank algorithm, such as that described in A Short Introduction to Learning to Rank by Hang Li (IEICE Transactions on Information Systems, Volume E94.D Issue 10, Pages 1854-1862 (October 2011)) or Learning to Rank with Multiple Objective Functions by Krysta M. Svore, Maksims N. Volkovs, and Christopher J. C. Burges (WWW '11: Proceedings of the 20th International Conference on World Wide Web, Pages 367-376 (March 2011)), each of which is herein incorporated by reference in its entirety. As another example, the guided search system can train a neural network by collecting a set of combinations of filter criteria employed by users from, for example, a database, creating a first training set comprising the collected set of combinations of filter criteria, training the neural network in a first stage using the first training set, creating a second training set for a second stage of training comprising the first training set and filter criteria incorrectly detected as filter criteria to suggest (i.e., incorrectly predicted as highly likely to be employed by users) after the first stage of training; and training the neural network in a second stage using the second training set. Moreover, while FIGS. 4A and 4B include two separate filter criteria frequency data structures, one of ordinary skill in the art will recognize that filter criteria frequency data structures can be combined or joined to form a single filter criteria frequency data structure or split to form multiple filter criteria frequency data structures. One of ordinary skill in the art will recognize that the root of a filter criteria frequency data structure tree need not be associated with a geographic area and can be associated, for example, with any set of one or more filter criteria. Furthermore, the guided search system can employ filter criteria frequency data structures for different time periods, such as a filter criteria frequency data structure that represents user searches for different months or different seasons. Moreover, the filter criteria frequency data structures can include information about the order in which filter criteria were employed as part of a set of filter criteria. In one such example, filter criteria that were employed earlier in a user's search are closer to the root of a corresponding branch of a filter criteria frequency tree and filter criteria employed later are further away from the root. Thus, a filter criteria frequency data structure can include multiple entries and counts corresponding to the same set of filter criteria but having a different order. In some embodiments, rather than, or in addition to, using the filter criteria frequency data structures to track the frequency with which users use particular filter criteria, the filter criteria frequency data structures can be used to automatically track the frequency with which users perform other behaviors after performing searches using particular filter criteria, such as how often users complete a desirable downstream user action after they use that filter. For example, the guided search system may train a neural network to predict the likelihood that a user that performs a search using a particular set of filter criteria will then save a home, share a home, submit a contact to an agent, etc. In some embodiments, the filter criteria frequency data structures maintain other types of frequency data in addition to (or instead of) the frequency with which filter criteria are used to filter search results, such as the frequency with which users take a particular action after performing a search with corresponding filter criteria, such as saving a listing into a set of "saved listings" associated with the user, sharing a listing, submitting contact information, clicking on a listing, registering to receive additional information about one or more listings, sending a message (e.g., email, text, online submission form) regarding one or more listings, saving search results, and so on.

Figure 5:
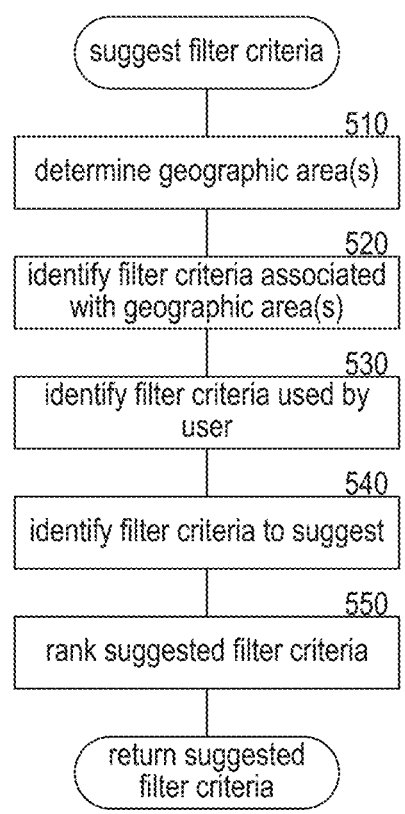
FIG. 5 is a flow diagram illustrating the processing of a suggest filter criteria component in accordance with some embodiments.

FIG. 5 is a flow diagram illustrating the processing of a suggest filter criteria component in accordance with some embodiments of the disclosed technology. The suggest filter criteria component is invoked by the guided search system to identify suggested filter criteria based on a user's search. In block 510, the component determines a geographic area associated with the user's search query. For example, the search query can include one or more geographic areas, such as a specified city or ZIP Code. In some examples, the determined geographic area can cover portions of multiple geographic areas, such as a shape manually drawn by a user that covers portions of multiple cities or ZIP codes, a user's selection of multiple cities or neighborhoods, etc. In block 520, the component identifies filter criteria that have been used in conjunction with the one or more determined geographic areas by, for example, accessing a filter criteria frequency data structures corresponding to the geographic area(s). As another example, the component can identify filter criteria that have been used in conjunction with the one or more determined geographic areas by, for example, accessing a global filter criteria frequency data structure. In another example, rather than accessing filter criteria based-solely on geographic area, the component can identify filter criteria that have been used by the user or a group of similar users, such as users that have been identified as having similar interests or demographic information, by identifying filter criteria frequency data structures specific to that user or group of users. In block 530, the component identifies filter criteria that the user submitted as the user's search query, such as filter criteria that the user has used during a current search session or during previous search sessions. In block 540, the component identifies filter criteria to suggest based on the filter criteria associated with the determined geographic area(s) and the filter criteria that the user has previously used. For example, if the user has performed a search for homes in Miami, FL with a water view and at least two bedrooms, the guided search system can identify all filter criteria that have previously been used in conjunction with searches for homes in Miami, FL with a water view and at least two bedrooms by accessing one or more filter criteria frequency data structures, such as a global filter criteria frequency data structure, a filter criteria frequency data structure(s) specific to a user or group of users, and/or a filter criteria frequency data structure(s) specific to a geographic area(s). Moreover, the component can combine the results from multiple filter criteria frequency data structure by computing a weighted average (e.g., weighted arithmetic mean, weighted geometric mean, weighted harmonic mean, weighted median, etc.) of the number of times a particular filter criterion has been used with other filter criteria. The weighted average can be based on the number of searches represented by (or associated with) each of the filter criteria frequency data structures from which results are being combined, so that a filter criteria frequency data structure that represents more searches is given more weight than a filter criteria frequency data structure that represents fewer searches so that the contribution of each filter criteria frequency data structure to the resulting weighed rank or weighted "score" is based on its size (i.e., the number of searches represented in the filter criteria frequency data structure). In other embodiments, the weights (zero or non-zero) can be determined according to a different strategy, such as evenly, based on user preference, user-defined weights, and so on. In block 550, the component ranks the identified filter criteria to suggest and then returns the ranked filter criteria. For example, the component can rank the identified filter criteria by the number of times (or a weighted number of times) they have been used in conjunction with searches for homes in Miami, FL with a water view and at least two bedrooms and/or the number of times (or weighted number of times) the identified filter criteria, when used in conjunction with the filter criteria of the user's search query, has resulted in a particular downstream user action, etc., and then provide a predetermined number or percentage of the results. In some embodiments, a means for suggesting filter criteria comprises one or more computers or processors configured to carry out an algorithm disclosed in FIG. 5 and this paragraph.

Figure 6:
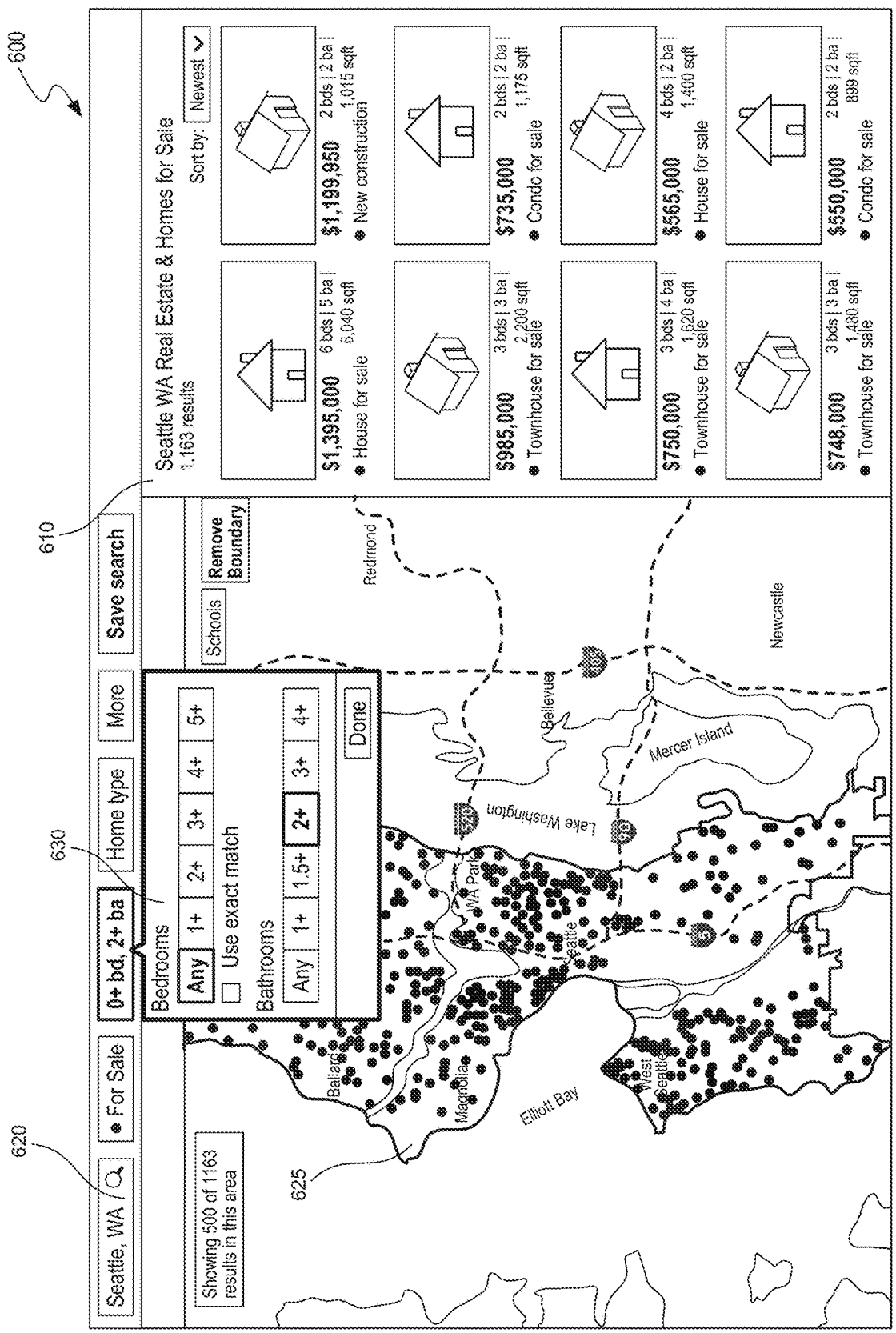
FIG. 6 is a display page illustrating a user interface for specifying filter criteria and displaying listings in accordance with some embodiments.

FIG. 6 is a display page 600 illustrating a user interface for specifying filter criteria and displaying listings in accordance with some embodiments of the disclosed technology. In this example, display page 600 includes text box 620 for specifying a geographic area, map view 625 for selecting or specifying and displaying a geographic area, filter criteria specification user interface element 630 for specifying filter criteria, such as a number of bedrooms or a number of bathrooms, and results section 610 for displaying results of listings consistent with a user's search. In this example, the user has searched form homes in Seattle with any number of bedrooms and two or more bathrooms.

Figure 7:
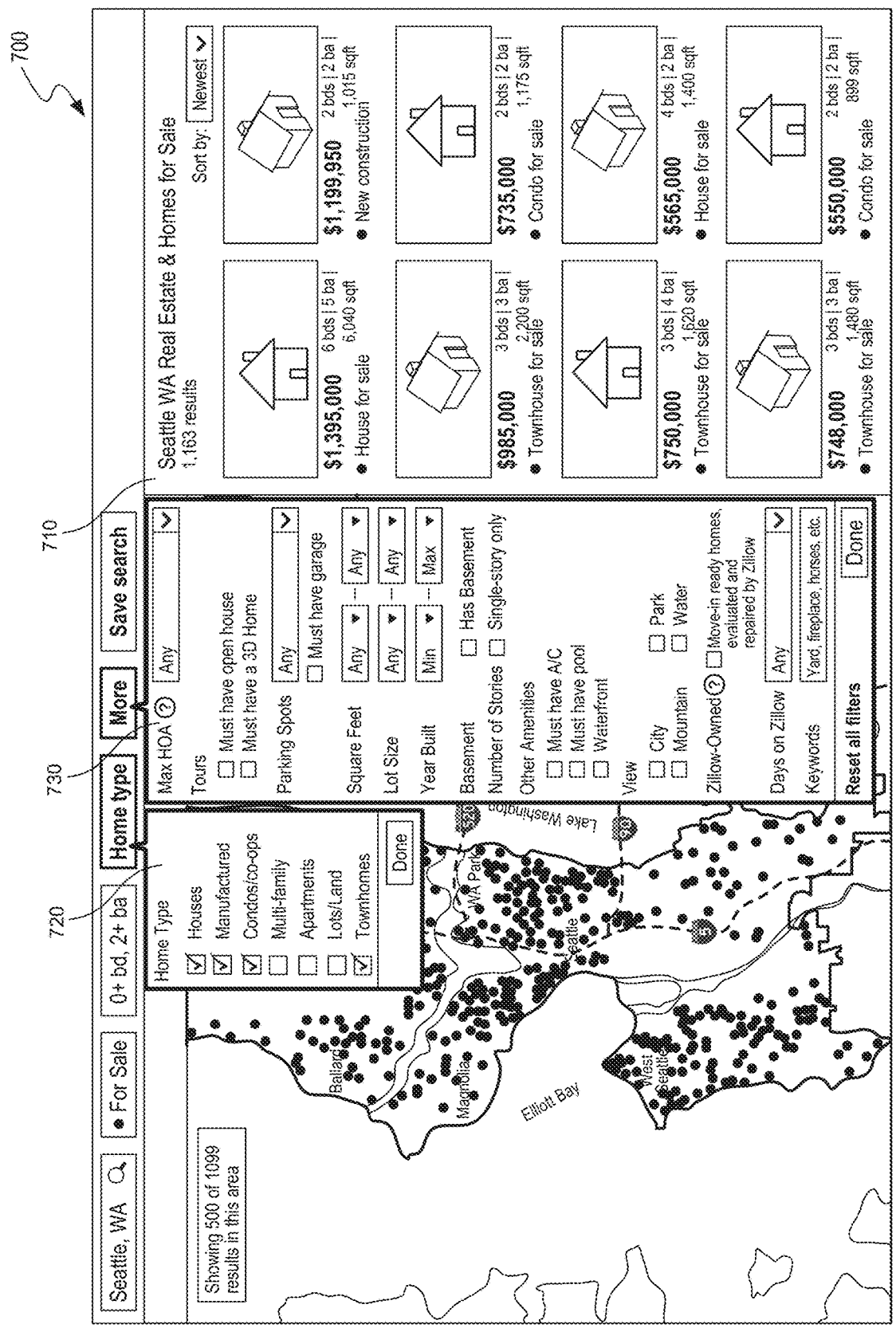
FIG. 7 is a display page illustrating a user interface for specifying filter criteria and displaying listings in accordance with some embodiments.

FIG. 7 is a display page 700 illustrating a user interface for specifying filter criteria and displaying listings in accordance with some embodiments of the disclosed technology. In this example, display page 700 includes filter criteria specification user interface elements 720 and 730 for specifying filter criteria, such as a home types, maximum homeowners association fees (e.g., monthly or annual), tour types, amenities, and so on, and results section 710 for displaying results of listings consistent with a user's search. In this example, the user has searched for homes for sale in Seattle with the following home types: houses, manufactured, condos/co-ops, and townhouses.

Figure 8:
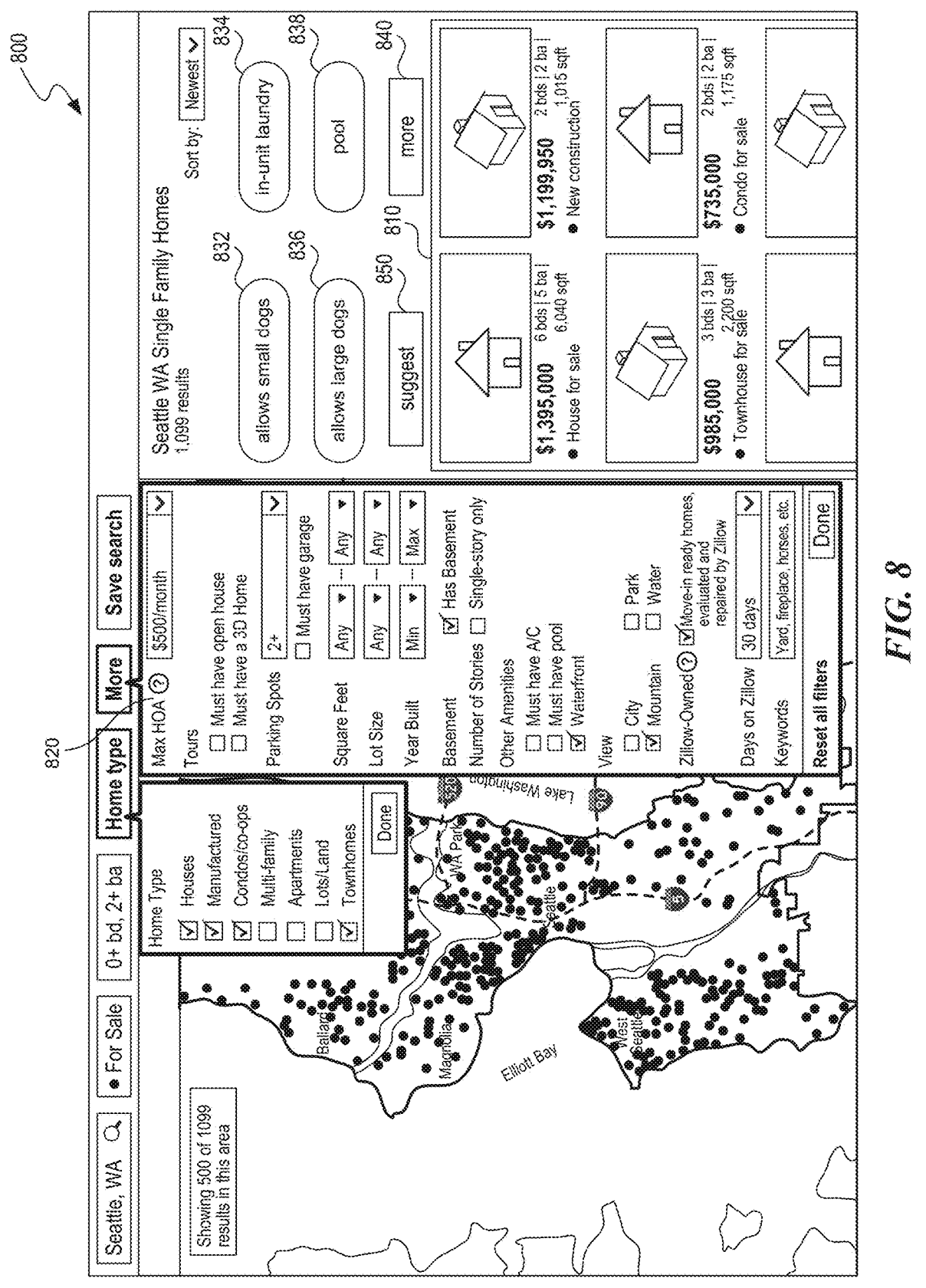

FIG. 8 is a display page 800 illustrating a user interface for specifying filter criteria and displaying listings and suggested filter criteria in accordance with some embodiments of the disclosed technology. In this example, display page 800 includes filter criteria specification user interface elements 820 for specifying filter criteria, results section 810 for displaying results consistent with a user's search, suggested filter criteria selection buttons 832-838, more button 840, and suggest toggle button 850. Suggested filter criteria selection buttons 832-838 were determined by the guided search system in accordance with the disclosed technology and allow a user to further customize their search by selecting one or more of the buttons (e.g., by clicking on the button, mouseover, clicking a check box associated with the button, etc.). For example, suggested filter criteria selection button 832, in response to being selected, further limits search results to listings for properties that allow small dogs by, for example, submitting an updated query with the new filter criterion, and updates or refreshes results section 810 in accordance with the updated search results. Similarly, suggested filter criteria selection buttons 834-838 further limit search results to properties with in-unit laundry 834, that allow large dogs 836, and that have a pool 838. Furthermore, in some embodiments, selection of a suggested filter criteria button causes the guided search system to update relevant filter criteria frequency data structures by, for example, retraining a predictive model based on the new selection, updating a filter criteria frequency data structure with the new information, etc. In this manner, a user's interactions with the suggested filter criteria buttons further improves the guided search system's ability to predict and suggest appropriate filter criteria at or near real-time, thereby improving the user's interaction with the listings provider and its associated website and conserving valuable resources of both the user and the listings provider. Furthermore, the user's interactions with the guided search system provides a feedback loop for training and retraining predictive models for predicting which filter criteria a user is likely to employ. Suggest toggle button 850 allows a user to turn filter criteria suggestions on or off. For example, if the user has determined that the current results are sufficient, the user may wish to replace the presentation of suggested filter criteria with the presentation of additional listings. More button 840 allows a user to see more suggested filter criteria. For example, if the user is not interested in the suggested filter criteria that are visible, the user can select more button 840 to see additional suggested filter criteria, if any. In this example, the user has searched for waterfront homes for sale in Seattle with the following home types: houses, manufactured, condos/co-ops, and townhouses that have a monthly homeowner's association fees that do not exceed $500, two or more parking spots, a basement, a mountain view, is move-in ready, and has been listed for 30 days or less. While indications of the suggested filter criteria are represented in this example as user interface buttons, one of ordinary skill in the art will recognize that any form of user interface components can be used to present suggest filter criteria to a user, such as text, text-based links, voice/audio commands or voice/audio prompts, and so on.

Figure 9:
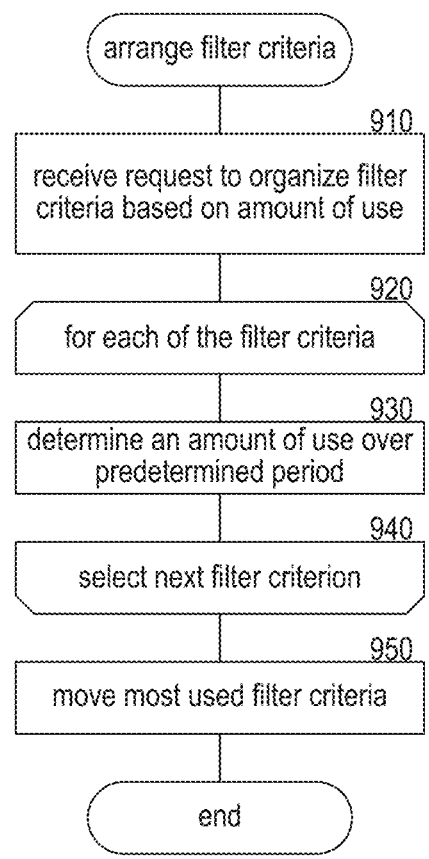
FIG. 9 is a flow diagram illustrating the processing of an arrange filter criteria component in accordance with some embodiments.

FIG. 9 is a flow diagram illustrating the processing of an arrange filter criteria component in accordance with some embodiments of the disclosed technology. The guided search system invokes the arrange filter criteria component to arrange user interface elements corresponding to suggested filter criteria within a user interface. In block 910, the component receives a request to organize filter criteria based on their use. For example, the component can receive a request in response to a user submitting a query, an automated or periodic refresh request from the guided search system, a manual request from a user, such as a user's selection of a suggest toggle button to toggle on filter criteria suggestions, in response to a change in filter state, and so on. In blocks 920-940, the component loops through each filter criterion of the suggested filter criteria, such as filter criteria provided by a suggest filter criteria component, and determines an amount of use or ranking for each filter criterion. In block 930, the component determines an amount of use or ranking for the currently selected filter criterion for a predetermined period, such as a previous hour, day, week, month etc. For example, the component can access a filter criteria frequency data structure to determine an amount of use for each of the filter criteria, such as the number of times each of the filter criteria has been used in conjunction with a particular set of filter criteria, the number of times the filter criteria, when used in conjunction with a particular set of filter criteria, has resulted in a particular downstream action, and so on. As another example, the component can receive amount of use information from the suggest filter criteria component, such as a ranking of the suggested filter criteria. In block 940, if there are any remaining filter criterion left to be processed then the component loops back to block 920 to select the next filter criterion for processing, otherwise the component continues at block 950. In block 950, the component arranges the processed filter criteria according to the amount of use by, for example, arranging, moving, or ordering buttons or other user interface elements corresponding to the filter criteria based on how frequently the filter criteria have been used. In one example, the filter criteria that have been used more frequently are presented more prominently, such as at the top of a list of suggested filter criteria or earlier during a set of voice or audio prompts, while the filter criteria that have been used least frequently are displayed less prominently or not at all. In some embodiments, a means for arranging suggested filter criteria comprises one or more computers or processors configured to carry out an algorithm disclosed in FIG. 9.

While various filters have been used as examples herein, one of ordinary skill in the art will recognize that listings can be filtered according to any number of fields or attributes, including listing type, listing status, price (e.g., minimum and/or maximum), number of bedrooms (e.g., minimum and/or maximum), number of bathrooms (e.g., maximum and/or minimum), property type (e.g., house, apartment, condominium, duplex, townhome, barn, log cabin, houseboat, commercial, industrial), owners association fees (e.g., maximum and/or minimum), open house availability, 3D home availability, parking spaces (e.g., maximum and/or minimum), garage, square footage (e.g., maximum and/or minimum), lot size (e.g., maximum and/or minimum), year built (e.g., earliest and/or latest), basement status (e.g., finished or unfinished), basement type, number of stories (e.g., maximum and/or minimum), air conditioning, pool, waterfront, city view, park view, mountain view, water view, ocean front, lake front, frontage feet, ownership (e.g., current resident, property broker, property management company), number of days listed (e.g., maximum and/or minimum), allows large dogs, allows small dogs, allows cats, room for other animals (e.g., horses, cows, goats), in-unit laundry, whether or not the property owner/manager will take particular types of applications, whether or not there are income or other restrictions associated with the property. In some embodiments, the guided search system provides support for users wishing to filter search results based on parking type, neighborhood, city, state, ZIP code, borough, county, nearby school(s), school districts, school attendance zone, school ratings (e.g., elementary, middle, junior high, high), street, community, subdivision, building, other unofficial regional information, unofficial regional terms (e.g., Silicon Valley, Lake Tahoe, West Seattle, On Lake Washington), open houses, price changes, data retrieved from a multiple listing service (MLS), new construction availability date, senior housing, single story living, photo count, room count, territorial view, estimated monthly payment, student housing, tax assessed value, owner occupied, new construction available lot/plan count, new construction move in ready, new construction under construction, and so on. Furthermore, the filter criteria can relate to the presence (true or false), quantity, and/or size(s) of various features, such as attics, barbeque areas, ceiling fans, decks, doorkeepers, elevators, fenced yard, gardens, gated entries, greenhouses, hot tubs, spas, saunas, jacuzzies, intercoms, jetted tubs, lawns, mother-in-law apartments, ponds, porches, patios, skylights, sprinkler systems, sports courts, double pane windows, storm windows, wet bars, RV parking, security system, wired for cable, wired for high speed networking, satellite tv ready, high speed internet availability, vaulted ceilings, docks, basketball court, storage availability, tennis court, quarter baths, half baths, ¾ baths, full baths, fireplaces, breakfast nooks, dining rooms, family rooms, laundry rooms, libraries, master baths, mud rooms, offices, pantries, recreation rooms, workshops, solariums, atriums, sun rooms, walk-in closets, included appliances, floor covering, foundation type, fitness center proximity and availability, proximity to transportation options, and so on. In some embodiments, the guided search system provides support for filters that allow users to narrow search results based on Zestimates and other estimates of a home's market value or rental value, a home's forecasted value, forecasted valuations, architecture style, architecture type, year updated, roof type, primary exterior material, primary heating source, covered parking spaces, primary heating system, primary cooling system, swimming pool type, building shape type, construction quality type, construction type, garage carport location type, attic square feet, per floor square feet, lot depth, lot width, unit count, garage square feet, basement square feet (finished, unfinished), addition square feet, which floor a unit is on, whether or not the home is furnished, controlled access, 55-plus active community, assisted living community, maintenance fees, common charges, ADU (Accessory Dwelling Unit) status, handicapped access, and so on.

Unless the context clearly requires otherwise, throughout the description and the claims, the words "comprising," "comprise," and the like are to be construed in an inclusive sense, as opposed to an exclusive or exhaustive sense; that is to say, in the sense of "including, but not limited to." As used herein, the terms "coupled," "connected," or any variant thereof, mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or" in reference to a list of two or more items, covers all of the following interpretations of the word: any of the items in the list all of the items in the list, and any combination of the items in the list.

The above Detailed Description of examples of the disclosed subject matter is not intended to be exhaustive or to limit the disclosed subject matter to the precise form disclosed above. While specific examples for the disclosed subject matter are described above for illustrative purposes, various equivalent modifications are possible within the scope of the disclosed subject matter, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative combinations or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The disclosure provided herein can be applied to other systems, and is not limited to the system described herein. The features and acts of various examples included herein can be combined to provide further implementations of the disclosed subject matter. Some alternative implementations of the disclosed subject matter can include not only additional elements to those implementations noted above, but also can include fewer elements.

Any patents and applications and other references noted herein, including any that can be listed in accompanying filing papers, are incorporated herein by reference in their entireties. Aspects of the disclosed subject matter can be changed, if necessary, to employ the systems, functions, components, and concepts of the various references described herein to provide yet further implementations of the disclosed subject matter.

These and other changes can be made in light of the above Detailed Description. While the above disclosure includes certain examples of the disclosed subject matter, along with the best mode contemplated, the disclosed subject matter can be practiced in any number of ways. Details of the guided search system can vary considerably in the specific implementation, while still being encompassed by this disclosure. Terminology used when describing certain features or aspects of the disclosed subject matter does not imply that the terminology is being redefined herein to be restricted to any specific characteristics, features, or aspects of the disclosed subject matter with which that terminology is associated. In general, the terms used in the following claims should not be construed to limit the disclosed subject matter to specific examples disclosed herein, unless the above Detailed Description section explicitly defines such terms. The scope of the disclosed subject matter encompasses not only the disclosed examples, but also all equivalent ways of practicing or implementing the disclosed subject matter under the claims.

To reduce the number of claims, certain aspects of the disclosed subject matter are presented below in certain claim forms, but the applicant contemplates the various aspects of the disclosed subject matter in any number of claim forms. For example, aspects of the disclosed subject matter can be embodied as a means-plus-function claim, or in other forms, such as being embodied in a computer-readable medium. (Any claims intended to be treated under 35 U.S.C. § 112(f) will begin with the words "means for," but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

From the foregoing, it will be appreciated that specific embodiments of the disclosed subject matter have been described herein for purposes of illustration, but that various modifications can be made without deviating from the scope of the disclosed subject matter. For example, while geographic area has been described as a primary attribute for identifying filter criteria associated with real estate listings, one of ordinary skill in the art will recognize that any specified geographic area itself represents specific criteria for a filter. Moreover, one of ordinary skill in the art will recognize that the real estate and property listings are provided as an example type of listings, that the disclosed subject matter can be used to suggest filter criteria for any type of listings, such as listings for goods, listings for services, auction listings, television program listings, movie listings, and so on that may or may not have a specific relationship to a geographic area. Additionally, while advantages associated with certain embodiments of the new technology have been described in the context of those embodiments, other embodiments can also exhibit such advantages, and not all embodiments need necessarily exhibit such advantages to fall within the scope of the technology. As another example, in addition or as an alternative to using selections of filter criteria to predict which filter criteria a user is likely to employ to further narrow search results, the guided search system can also base these predictions on other interactions or data about the user, such as online searches that the user has performed, goods or services that the user has purchased or signed up for in the past, demographic information about the user, and so on. The guided search system can map filter criteria to (or associate filter criteria with) user behavior, user data, social media interactions, etc. and use these mappings as a basis for predicting filter criteria to present to a user. For example, the filter criteria frequency data structure can include additional information about how frequently different filter criteria are used by users that perform particular web searches, follow particular accounts on social media, perform certain social media interactions (e.g., like, follow, message), have requested particular information via a virtual assistant, and so on. As another example, the guided search system can use a user's purchase or browsing history to make inferences about their preferences, such as an inference that a user who has searched for playground equipment is more likely to be interested in homes that have a yard. Thus, the guided search system can better predict which filter criteria a user may employ based on a more comprehensive assessment of that user's behavior and preferences. Accordingly, the disclosure and associated technology can encompass other embodiments not expressly shown or described herein. Although the subject matter has been described in language specific to structural features and/or methodological acts, it is to be understood that the disclosed subject matter is not necessarily limited to the specific features or acts described above. Rather, the specific features and acts described above are disclosed as example forms of the disclosed subject matter. To the extent any materials incorporated herein by reference conflict with the present disclosure, the present disclosure controls.

We claim:

1. A system for arranging filter criteria within a user interface comprising:
   at least one hardware processor; and
   at least one non-transitory memory storing instructions, which when executed by the at least one hardware processor, cause the system to:
      receive, from a first user, a search request comprising a search criterion for searching a database and a first set of filter criteria;
      identify a set of real estate listings associated with the search criterion and satisfying the first set of filter criteria;
      provide for display an indication of at least one of the identified set of real estate listings;
      identify a second set of filter criteria to suggest to the first user based on usage metrics of filter criteria previously used by users other than the first user when searching for real estate listings associated with the search criterion;
      determine that a first amount of use of a first filter criterion in the first set of filter criteria is greater than a second amount of use of a second filter criterion in the second set of filter criteria; and in response to determining that the first amount of use is greater than the second amount of use, automatically adjust a position of the first filter criterion within the user interface with respect to a position of the second filter criterion within the user interface, wherein the position of the first filter criterion is more prominent than the position of the second filter criterion.

2. The system of claim 1, wherein the instructions when executed by the at least one hardware processor, further cause the system to:
   determine that the first set of filter criteria has been employed by the other users; and
   in response to determining that the first set of filter criteria has been employed by other users, increment a count associated with the first set of filter criteria.

3. The system of claim 1, wherein the instructions when executed by the at least one hardware processor, further cause the system to:
   access a filter criteria frequency data structure, wherein the access includes:
      search the filter criteria frequency data structure, that represents searches performed for listings associated with the search criterion, for searches that employed the first set of filter criteria.

4. The system of claim 1, wherein identifying the second set of filter criteria to suggest to the user is based on the second set of filter criteria being used within a predetermined time period.

5. A computer-implemented method for arranging filter criteria within a user interface, the computer-implemented method comprising:
   receiving, from a first user, a search request comprising a search criterion for searching a database and a first set of filter criteria;
   identifying a set of database listings associated with the search criterion and satisfying the first set of filter criteria;
   providing for display an indication of at least one of the identified set of database listings;
   identifying a second set of filter criteria to suggest to the first user based on usage metrics of filter criteria previously used by users other than the first user when searching for database listings associated with the search criterion;
   determining that a first amount of use of a first filter criterion in the first set of filter criteria is greater than a second amount of use of a second filter criterion in the second set of filter criteria; and
   in response to determining that the first amount of use is greater than the second amount of use, automatically adjusting a position of the first filter criterion within the user interface with respect to a position of the second filter criterion within the user interface,
      wherein the position of the first filter criterion is more prominent than the position of the second filter criterion.

6. The method of claim 5, further comprising:
   determining that the first set of filter criteria has been employed by the other users; and
   in response to determining that the first set of filter criteria has been employed by other users, incrementing a count associated with the first set of filter criteria.

7. The method of claim 5, further comprising:
   determining that the first set of filter criteria has not been previously employed by other users; and
   in response to determining that the first set of filter criteria has not been employed by other users, creating a new entry for the first set of filter criteria in a filter criteria frequency data structure.

8. The method of claim 5, wherein the first set of filter criteria is provided by the first user.

9. The method of claim 5, further comprising:
   accessing a filter criteria frequency data structure, wherein the accessing includes:
      searching the filter criteria frequency data structure using the first set of filter criteria, that represents searches performed for listings associated with the search criterion, to identify the second set of filter criteria.

10. The method of claim 5, further comprising:
    accessing a filter criteria frequency data structure, wherein the accessing includes:
       searching the filter criteria frequency data structure using the first set of filter criteria, that represents searches performed for listings associated with the search criterion, to identify a set of candidate filter criteria;
       determining an amount of use for a plurality of sub-combinations of filter criterion of the first set of filter criteria used in conjunction with each filter criterion of the set of candidate filter criteria; and
       in response to the amount of use of a sub-combination of the plurality of sub-combinations used in conjunction with a respective filter criterion of the set of candidate filter criteria satisfying a threshold number, identifying the respective filter criterion as part of the set of second filter criteria.

11. The method of claim 5, wherein identifying the second set of filter criteria to suggest to the first user is based on the second set of filter criteria being used within a predetermined time period.

12. A non-transitory computer-readable storage medium storing instructions that, in response to being executed by a computing system having at least one processor and at least one memory, cause the computing system to perform a method, the method comprising:
    receiving, from a first user, a search request comprising a search criterion for searching a database and a first set of filter criteria;
    identifying a second set of filter criteria to suggest to the first user based on usage metrics of filter criteria previously used by users other than the first user when searching for database listings associated with the search criterion;
    determining that a first amount of use of a first filter criterion in the first set of filter criteria is greater than a second amount of use of a second filter criterion in and
    in response to determining that the first amount of use is greater than the second amount of use, automatically adjusting a position of the first filter criterion within a user interface with respect to a position of the second filter criterion within the user interface,
       wherein the position of the first filter criterion is more prominent than the position of the second filter criterion.

13. The non-transitory computer-readable storage medium of claim 12, the method further comprising:

determining that the first set of filter criteria has been employed by the other users; and in response to determining that the first set of filter criteria has been employed by other users, incrementing a count associated with the first set of filter criteria.

14. The non-transitory computer-readable storage medium of claim 12, the method further comprising:

determining that the first set of filter criteria has not been previously employed by other users; and in response to determining that the first set of filter criteria has not been employed by other users, creating a new entry for the first set of filter criteria in a filter criteria frequency data structure.

15. The non-transitory computer-readable storage medium of claim 12, wherein the first set of filter criteria is provided by the first user.

16. The non-transitory computer-readable storage medium of claim 12, the method further comprising:

accessing a filter criteria frequency data structure, wherein the accessing includes:

searching the filter criteria frequency data structure using the first set of filter criteria, that represents searches performed for listings associated with the search criterion, to identify the second set of filter criteria.

17. The non-transitory computer-readable storage medium of claim 12, the method further comprising:

accessing a filter criteria frequency data structure, wherein the accessing includes:

searching the filter criteria frequency data structure using the first set of filter criteria, that represents searches performed for associated with the search criterion, to identify a set of candidate filter criteria;

determining an amount of use for a plurality of sub-combinations of filter criterion of the first set of filter criteria used in conjunction with each filter criterion of the set of candidate filter criteria; and in response to the amount of use of a sub-combination of the plurality of sub-combinations used in conjunction with a respective filter criterion of the set of candidate filter criteria satisfying a threshold number, identifying the respective filter criterion as part of the set of second filter criteria.

18. The non-transitory computer-readable storage medium of claim 12, wherein identifying the second set of filter criteria to suggest to the first user is based on the second set of filter criteria being used within a predetermined time period.

* * * * *